C. MULLER.
DRAWING APPARATUS.
APPLICATION FILED AUG. 1, 1921.

1,406,061.

Patented Feb. 7, 1922.

Inventor:
Charles Muller,
By
Atty.

UNITED STATES PATENT OFFICE.

CHARLES MULLER, OF ZURICH, SWITZERLAND.

DRAWING APPARATUS.

1,406,061.      Specification of Letters Patent.      Patented Feb. 7, 1922.

Original application filed April 2, 1920, Serial No. 370,694. Divided and this application filed August 1, 1921. Serial No. 489,015.

*To all whom it may concern:*

Be it known that I, CHARLES MULLER, a citizen of the Republic of Switzerland, residing at Zurich, Switzerland, have invented certain new and useful Improvements in Drawing Apparatus, and do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to drawing apparatus of the type wherein two links are provided parallel to each other and adapted to act as parallel guide for square, rules and the like.

The object of the present invention is to improve and simplify such apparatus.

To this end the apparatus according to the invention comprises at least one heavy roller-like transporting means adapted to travel over the plane of a drawing and which is mounted in a stirrup. Two parallel links are connected by pin joints with their one ends to said stirrup and with their other ends to a disc, the latter being provided with means for securing squares, rules and the like thereto.

This application forms a division of my copending application Ser. No. 370694, filed April 2nd, 1920.

Several constructional examples of the invention are shown in the accompanying drawings, in which.

Figure 2:
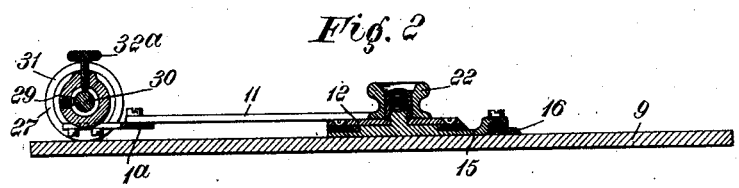
Fig. 2 is a section along line E—F of Fig. 1.
Figure 1:
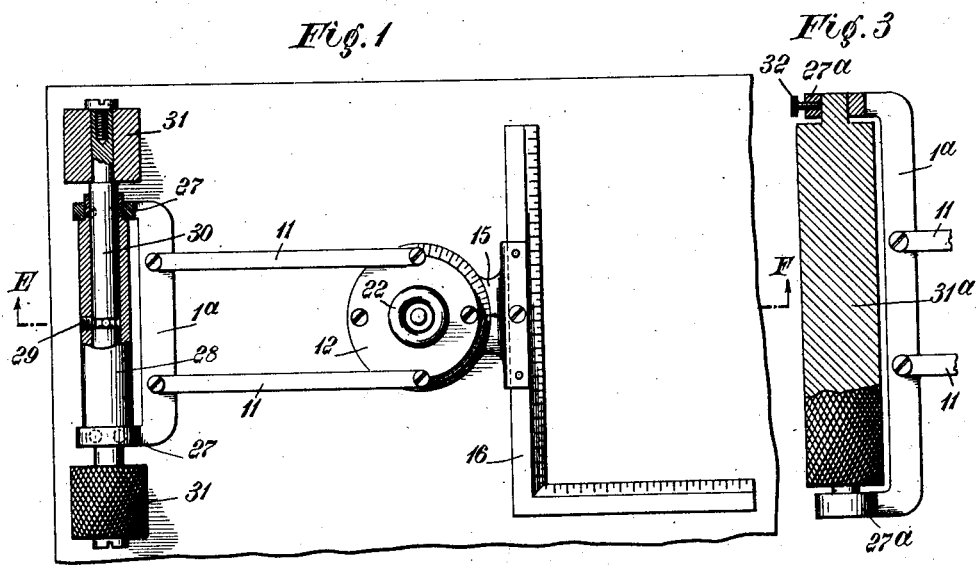
Fig. 1 is a plan view of a first example partly shown in section.

Referring to the first constructional example of the apparatus illustrated in Figs. 1 and 2, the means which adapt the apparatus to travel over the plane of a drawing consists of two rollers 31 fixed to the ends of an axle 30. The treads of the rollers 31 are roughened and the rollers are of heavy weight, the latter may be attained either by dimensioning the rollers amply, or by making them of a heavy material or by filling them with heavy material. The axle 30 is rotatably carried in a bush 28 and secured against axial displacement by means of a set screw 29 entering into a circular groove of the axle. A stirrup like member 1ª is connected to the axle carrying the rollers by means of bearings 27 in which said bush 28 is fixed. To the flat portion of the stirrup-like member the one ends of the two links 11 are connected by pin joints whilst their other ends are connected in the same manner to a disc 12. This disc 12 carries a square 16 by means of a bracket 15 which is adjustable into any position around the centre of the disc. In the centre of the disc a knob 22 is provided and by moving the knob by hand the square 16 may be moved in any direction over the plane of the drawing and during such movement the links 11 will always remain parallel to each other and likewise all the positions of the square 16 will be parallel to each other.

Figure 3:
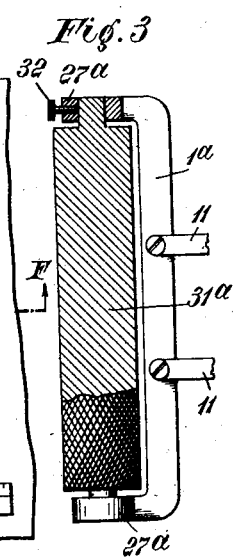
Fig. 3 shows a modification of a detail.

The modification according to Fig. 3 shows the arrangement of a single roller 31ª instead of the two rollers 31 shown in the previously described example, the outer ends of roller 31ª being rotatably carried in bearings 27ª. 32 designates a set screw by which the rotation of the roller 31ª in the bearing can be stopped. This set screw 32 corresponds to the set screw 32ª provided for the same purpose in the example shown in Figs. 1 and 2.

Figure 4:
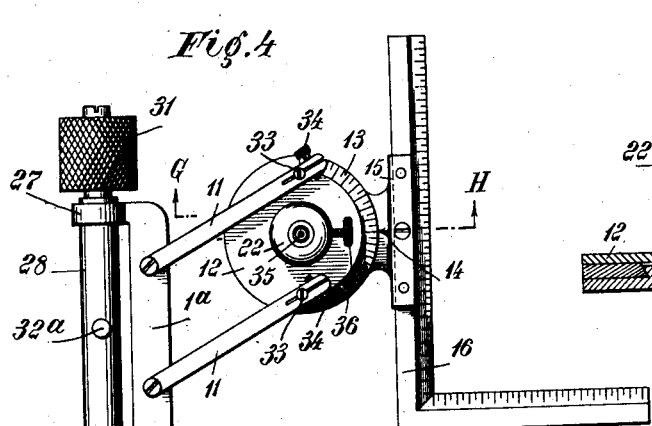
Fig. 4 is a plan view of another modified construction.
Figure 5:
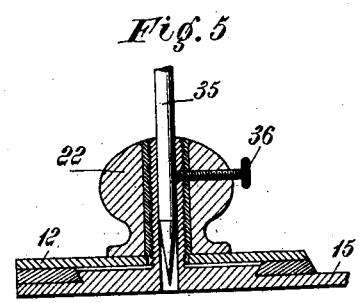
Fig. 5 is a section on line G—H of Fig. 4.

The feature of the modification shown in Fig. 4 consists in the provision of clamping screws 34 for stopping the turning motion of the links 11 about the pins 33. Further in this arrangement knob 22, disc 12 and bracket 15 are provided with a bore to take up a drawing pencil, which is held in position by set screw 36. Tightening the clamping screw 34 enables to draw horizontal parallel lines with said drawing pencil by causing the rollers 31 to move along the drawing.

I claim:

1. In a drawing apparatus, the combination of at least one heavy, roller-like means, a stirrup-like member for mounting said means thereon, a disc, two parallel links pivotally connected to said stirrup member and disc, and means to secure a straight edge or the like for guiding a drawing utensil to said disc.

2. In a drawing apparatus, the combination of at least one heavy, roller-like means adapted to allow of the travelling of the apparatus over the plane of a drawing, the roller-like means being roughened at its tread by flutes, a stirrup-like member for mounting said means thereon, a disc, two parallel links pivotally connected to said stirrup member and disc, and means to secure a straight edge or the like for guiding a drawing utensil to said disc.

3. In a drawing apparatus, the combination of an axle, a heavy roller with roughened tread provided at each end of said axle, a sleeve arranged on said axle between said two rollers, a stirrup-like member operatively connected to said sleeve, a rotatable connection between said rollers and said stirrup-like member, a disc, two parallel links pivotally connected to said stirrup member and disc, and means to secure a straight edge or the like for guiding a drawing utensil to said disc.

In testimony that I claim the foregoing as my invention, I have signed my name.

CHARLES MULLER.